United States Patent [19]

Farmer

[11] Patent Number: 4,742,673
[45] Date of Patent: May 10, 1988

[54] METHOD OF TESTING TWISTER RING WARP AND APPARATUS THEREFOR

[75] Inventor: Bernice R. Farmer, Gastonia, N.C.

[73] Assignee: PPG Industries, Inc., Pittsburgh, Pa.

[21] Appl. No.: 61,647

[22] Filed: Jun. 15, 1987

[51] Int. Cl.[4] .................. D01H 7/54; G01C 9/18; G01C 9/36
[52] U.S. Cl. ...................................... 57/1 R
[58] Field of Search ............. 51/1 R, 119, 121, 122; 33/178 R, 178 B, 178 C, 370, 374, 375, 377, 380, 381, 390

[56] References Cited

U.S. PATENT DOCUMENTS

| | | | |
|---|---|---|---|
| 1,159,516 | 11/1915 | Machin et al. | 33/390 X |
| 2,856,696 | 10/1958 | Williams | 33/390 X |
| 3,380,144 | 4/1968 | Cunningham | 57/1 R X |
| 4,085,515 | 4/1978 | Darden | 33/370 X |
| 4,302,962 | 12/1981 | Williams | 33/365 X |
| 4,532,718 | 8/1985 | Copeland | 33/390 |

Primary Examiner—Donald Watkins
Attorney, Agent, or Firm—John E. Curley

[57] ABSTRACT

An apparatus and method for measuring twister ring warp on a twister frame are described. The apparatus involves a levelling device having flat contact points which engage the twister ring on the frame, and when all contact points are touching, the ring indicates the degrees of deflection from flat exhibited from the ring.

6 Claims, 1 Drawing Sheet

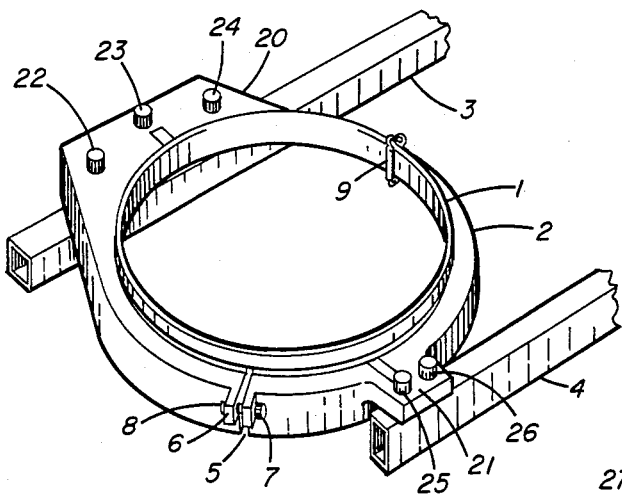
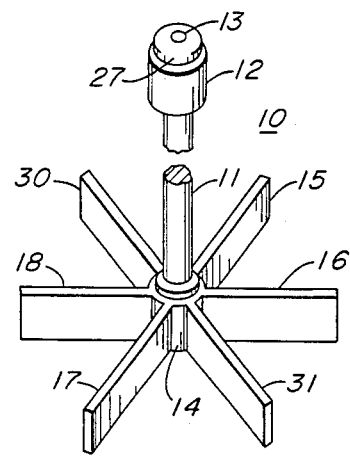
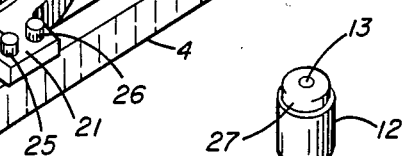
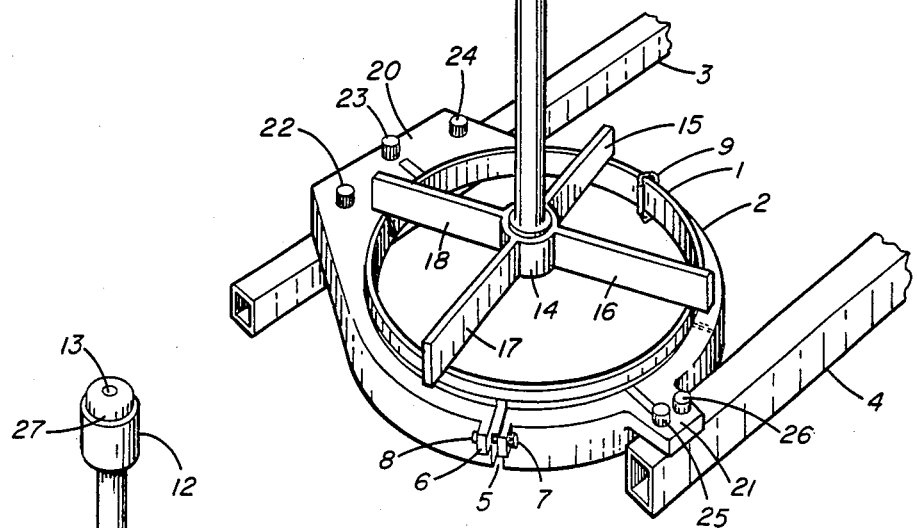
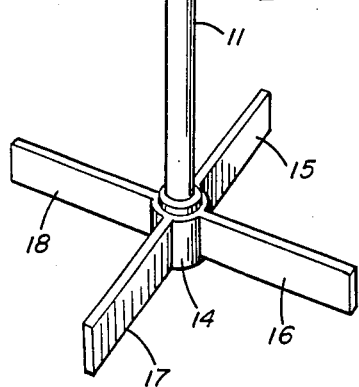
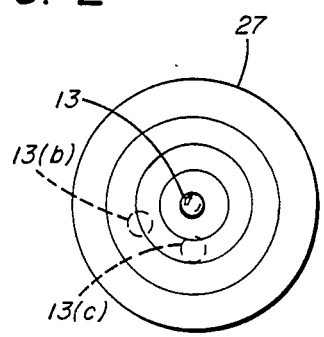

METHOD OF TESTING TWISTER RING WARP AND APPARATUS THEREFOR

The present invention relates to the testing of twist frame twister rings to determine if they are warped. More particularly, the present invention relates to a novel measuring device useful in determining if a twist frame twister ring is warped. Still more particularly, the present invention relates to a method and apparatus for testing ring warp on textile twist frames without requiring the removal of the ring holder.

BACKGROUND OF THE INVENTION

In the operation of modern twist frames it is common practice to twist and wind yarns on bobbins which are placed on a spindle. Each of the bobbins is positioned inside of a ring holder and ring which is affixed to a rail that moves vertically in an up and down stroke mode as the twist frame operates. The ring holder is a device which holds a ring on the inside thereof and a traveler rides around the surface of the twister ring depositing yarn on the bobbin surface to build the yarn thereon. The spindle rotates the bobbin during the twist and wind operation. As long as the yarn riding around the twister ring on the traveler rides on a flat, level ring, the package build will be uniform, and the resulting bobbin acceptable. Should the twister ring become warped and no longer present a flat surface, however, the yarn build on the bobbin becomes unacceptable, and the bobbin produced from such a ring can be rejected by the user because of poor yarn quality or by the manufacturer because of inadequate build on a given bobbin.

To test the twister ring for warpage on a routine basis requires the time consuming process of removing the rings from each bobbin position. In a modern twist frame this may involve as many as 80 ring holders or more which must be unbolted from the frame and loosened sufficiently to remove the ring so it can be placed on a flat surface to measure distortion. An operation such as that can require 16 hours or more to complete on a given twist frame and this results in substantial loss of production time for that frame. For this reason a need exists for a quick, simple method to measure twist ring warp while the ring is in place on the frame to thereby avoid the costly process of removing rings for testing. By virtue of the instant invention that need in the art has been satisfied.

SUMMARY OF THE INVENTION

A method of testing twist ring surfaces for warpage while the rings remain on a twist frame is provided which involves placing a plurality of arms radially extending from a vertical shaft or post on the surface of the ring to be tested. The arms contacting the ring surface have surfaces which are coextensive in the same plane. The arms are forced onto the surface of the ring by applying pressure to the shaft until all arms are touching the ring surface. A levelling means such as a levelling bubble is located in the upper end of the shaft and when all arms are contacting the ring surface, the bubble is observed to determine if it has moved off center. Movement off center and the extent of that movement is used to determine if the ring is to be removed because of excess warpage. This can be accomplished by placing a scale around the bubble in the form of inscribed circles which measures the distance of the bubble when it moves off center and correlates that to an off center measurement of the post surface.

The tester of the instant invention is comprised of a shaft having a plurality of radially extending arms adjacent or at one end thereof. The other end of the shaft is provided with a leveling bubble on its upper surface which bubble is normally centered when the arms of the shaft are each resting on a flat surfaced object. The number of arms used can vary, but at least four should be used and regardless of the number used, in general the arms are spaced equidistant from each other.

BRIEF DESCRIPTION OF THE DRAWING

For a more complete understanding of the invention, reference is made to the accompanying drawing in which:

FIG. 1 is a perspective view of a twist frame ring holder and ring mounted on the twist frame rails;

FIG. 2 is a perspective view of the ring holder and ring of FIG. 1 with the testing apparatus placed thereon; and FIG. 3 is a perspective view of one embodiment of the ring testing apparatus of the instant invention.

FIG. 3a is a perspective view of another embodiment of the ring testing apparatus of the instant invention.

FIG. 4 is an enlarged top view of the bubble guage shown in FIG. 3.

DETAILED DESCRIPTION OF THE INVENTION

Turning now to the drawings and in particular, to FIG. 1, there is shown therein a twister ring 1 held in place by a ring holder 2. The ring holder 2 is mounted through mounts 20 and 21 and bolts 22, 23, 24, 25 and 26 associated therewith on rails 3 and 4 which are attached to the twist frame (not shown) in a manner known to the skilled art. The ring holder 2 is split so that it can be loosened to release the ring 1 when it has to be changed. Thus, there is a slit 5 through the holder 2 which is provided with a clamping device 6 applied to both sides of the slit 5. The pin 7 is threaded into a hole 8 so that it can be used to tighten or loosen the holder 2 to thereby either release or retain the ring 1 therein. A twister ring traveller 9 is placed on the ring 1 and the yarn that is wound on the bobbins housed inside of ring holder 2 is carried by the traveler 9 around the ring during twisting in a flat circular path as the bobbin rotates on its spindle. As long as the path of the traveler 9 is flat in the circular plane that it travels in when the ring 1 is flat, there are no problems of package build on the bobbin surface. However, when the ring 1 becomes distorted in use by being warped so that its upper surface is no longer flat, problems occur in producing a uniform material build on the surface of the bobbin.

Turning now to FIGS. 2 and 3 there is shown the ring tester of the instant invention generally indicated as 10. The tester 10 is provided with a shaft 11 which has a cylindrical cap 12 attached to the end and in which is located a leveler 27 with leveling bubble 13 therein. Shaft 11 terminates at its other end in a hub 14 from the surface of which four arms 15, 16, 17 and 18, extend radially. The shaft 11 can be affixed to hub 14 by any suitable means preferably by welding. If desired, the end of the shaft can be threaded as shown at 19 so it can be mated with grooves (not shown) in the hub 14.

In FIG. 2 the tester 10 is shown in place on the ring 1 of the ring holder 2 with arms 15, 16, 17 and 18 resting on the surface of the ring 1. The under side of the shaft is bored to provide a hole therein that mates with the bobbin spindle thereby centering the shaft 11 therein. In a typical test of a warped ring two or three of the arms will sit on the ring surface without any pressure being applied to the shaft 11. The remaining arms or arm is contacted with the ring surface by applying downward pressure on shaft 11 until those arms or the remaining arm rests on the ring surface with the others. The bubble 13 is then observed and any deviation from center beyond a predetermined unacceptable deviation from center results in a removal of the ring for replacement. Slight deviation of the bubble within acceptable limits are noted, but the ring need not be replaced. These notations of acceptable and unacceptable degrees of flatness can be made by looking at the bubble and its position with respect to a scale inscribed on the cap. Thus, for example as shown in FIG. 5, the bubble 13 is normally in the center of leveler 27. If bubble 13 moves when a given ring is tested to a position such as 13(a), as shown in dotted lines of FIG. 5, this may be considered an acceptable deviation. If bubble 13 moves to a position such as 13(b) shown in FIG. 5, this may be an unacceptable amount of warp requiring a change.

Using the tester 10 of the instant invention each ring 1 on a twist frame can be tested on the frame in a matter of seconds, and it is thus possible to test all of the rings on a twist frame having 80 positions in a matter of 15 minutes. To test the same number of rings on the same sized frame by removing the rings would require 16 hours.

The tester 11 is preferably constructed of metal, stainless steel being preferred, but it can be made of rugged plastic such as cast polyesters, polycarbonates and the like. Thermoplastic materials such as high density polyethylenes and polypropylenes can also be used as long as care is exercised in preventing damage thereto by exposure to extreme heat. Regardless of the construction material employed, the bottom of the arms must all be on the same plane at all points on their under surface.

Further, it will be understood that more than four arms may be used to more precisely measure warpage. Thus, six, seven, eight, nine, ten or more arms may be employed if desired and preferably, each will be spaced equidistant from the arms adjacent to it. Thus, in FIG. 3a a tube having six arms 15, 16, 17, 18, 30 and 31 is shown.

Further, although the invention has been described with reference to certain specific embodiments, it is not intended to be limited thereby except insofar as appears in the accompanying claims.

I claim:

1. An apparatus for measuring distortion on a normally, flat, circular twister ring surface comprising a shaft, a plurality of arms attached to and extending radially from said shaft and adapted to rest on said circular twister ring surface, said arms being at least four in number and each arm being spaced equidistant from the arms adjacent thereto on either side thereof, a leveling bubble positioned in the end of said shaft and constructed to measure any deviation of said circular twister ring surface from a flat surface exhibited when all radially extending arms touch the ring surface.

2. The apparatus of claim 1 wherein more than four radially extending arms are attached to said shaft.

3. The apparatus of claim 1 wherein said arms extend radially from a hub attached to said shaft.

4. The apparatus of claim 2 wherein said arms extend radially from a hub attached to said shaft.

5. A method of measuring twist ring warp on a twist frame comprising placing a plurality of arms affixed to a vertical post on the surface of the ring to be tested, applying pressure downwardly on the post to firmly rest all of the arms on the surface of the ring and measuring any deflection of the post from the absolute vertical on a level affixed to the post to determine the extent of the ring warp present.

6. The method of claim 5 including the step of discarding any warped ring measured by said deflection when it exceeds a predetermined value.

* * * * *